US011602969B2

(12) United States Patent
Okubo

(10) Patent No.: US 11,602,969 B2
(45) Date of Patent: Mar. 14, 2023

(54) SUSPENSION CONTROL SYSTEM FOR VEHICLE

(71) Applicant: HONDA MOTOR CO., LTD., Tokyo (JP)

(72) Inventor: Naoto Okubo, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 620 days.

(21) Appl. No.: 16/720,992

(22) Filed: Dec. 19, 2019

(65) Prior Publication Data
US 2020/0198429 A1 Jun. 25, 2020

(30) Foreign Application Priority Data

Dec. 24, 2018 (JP) .............................. JP2018240418

(51) Int. Cl.
| | |
|---|---|
| *B60G 17/015* | (2006.01) |
| *B60G 17/08* | (2006.01) |
| *B60G 13/08* | (2006.01) |
| *B60W 10/22* | (2006.01) |
| *F16F 9/53* | (2006.01) |

(52) U.S. Cl.
CPC .......... *B60G 17/015* (2013.01); *B60G 13/08* (2013.01); *B60G 17/08* (2013.01); *B60W 10/22* (2013.01); *B60G 2202/322* (2013.01); *B60G 2600/00* (2013.01); *B60W 2510/22* (2013.01); *B60W 2710/22* (2013.01); *F16F 9/535* (2013.01)

(58) Field of Classification Search
CPC .................................................. B60G 17/015
See application file for complete search history.

(56) References Cited

U.S. PATENT DOCUMENTS

| | | | |
|---|---|---|---|
| 8,880,293 B2* | 11/2014 | Hirao ................. | B60W 10/184 |
| | | | 701/41 |
| 2015/0032332 A1* | 1/2015 | Kikuchi ............. | B60W 30/025 |
| | | | 701/37 |

FOREIGN PATENT DOCUMENTS

| | | | |
|---|---|---|---|
| CN | 103241095 A | * | 8/2013 |
| JP | 2011079520 A | | 4/2011 |

OTHER PUBLICATIONS

Yu, Miao; Choi, S; Dong, X; Liao, C; Fuzzy Neural Network Control for Vehicle Stability Utilizing Magnetorheological Suspension System; Mar. 2009; Sage Publications; Journal of Intelligent Material Systems and Structures; vol. 20 Issue 4. (Year: 2018).*

* cited by examiner

*Primary Examiner* — Elaine Gort
*Assistant Examiner* — Christopher R Cardimino
(74) *Attorney, Agent, or Firm* — Armstrong Teasdale LLP

(57) ABSTRACT

A suspension control system includes: a first electric current setting unit configured to set a first electric current based on an actual damping speed; a second electric current setting unit configured to set a second electric current based on a model damping speed; a weight coefficient setting unit configured to set a weight coefficient based on the actual damping speed; and a target electric current setting unit configured to set a sum of a first value and a second value as a target electric current of the damper, the first value being obtained by multiplying the second electric current by the weight coefficient, the second value being obtained by multiplying the first electric current by a value obtained by subtracting the weight coefficient from one. The first electric current setting unit is configured to make the first electric current smaller than the second electric current in a prescribed case.

5 Claims, 7 Drawing Sheets

SUSPENSION CONTROL SYSTEM FOR VEHICLE

TECHNICAL FIELD

The present invention relates to a suspension control system for a vehicle including a variable damping force damper.

BACKGROUND ART

With regard to a variable damping force damper that can change a damping force based on an electric current applied thereto, there is a method to set a target electric current applied to the variable damping force damper by referring to a map based on a target damping force and an actual damping speed, i.e. a stroke speed (see JP2011-079520A, for example). The target damping force is computed by skyhook control and the like. The actual damping speed is computed based on a signal from a stroke sensor that detects a stroke position of the variable damping force damper. In such a variable damping force damper, the actual damping speed is computed by differentiating the signal from the stroke sensor, so that the actual damping speed is likely to oscillate around zero (a neutral position) according to the unevenness of a road surface. In view of such a problem, a dead zone or a lower limit is set for the actual damping speed to prevent the target electric current from becoming excessive.

There is a case where a target damping force and a damping speed are computed based on a vehicle model, and a target electric current applied to a variable damping force damper is set based on the target damping force and the damping speed based on the vehicle model. In such a case, the damping speed based on the vehicle model is computed without considering the unevenness of a road surface, so that the damping speed based on the vehicle model is likely to be smaller than the aforementioned dead zone or the aforementioned lower limit in most normal traveling areas. Accordingly, it is difficult to properly generate the damping force of the damper in a case where the dead zone is set.

SUMMARY OF THE INVENTION

In view of such a problem of the prior art, a primary object of the present invention is to provide a suspension control system for a vehicle including a variable damping force damper, in which a damping force of the damper can be generated properly without being excessive.

To achieve such an object, one embodiment of the present invention provides a suspension control system (20) for a vehicle (100), including: a variable damping force damper (6) configured to change a damping force based on an electric current applied thereto; a vehicle sensor (9, 10) configured to detect a vehicle state quantity; a vehicle model computation unit (22) configured to compute at least one of a roll moment, a pitch moment, and a yaw moment generated at the vehicle and at least one of a roll rate, a pitch rate, and a yaw rate, based on the vehicle state quantity and a prescribed vehicle model; a target damping force computation unit (23) configured to compute a target damping force of the damper based on the at least one of the roll moment, the pitch moment, and the yaw moment; a model damping speed computation unit (24) configured to compute a model damping speed of the damper based on the at least one of the roll rate, the pitch rate, and the yaw rate; a first electric current setting unit (26) configured to set a first electric current of the damper based on the target damping force and one of an actual damping speed or an estimated damping speed, the actual damping speed being computed based on a signal input from a stroke sensor provided in the damper, the estimated damping speed being estimated based on a wheel speed; a second electric current setting unit (27) configured to set a second electric current of the damper based on the model damping speed and the target damping force; a weight coefficient setting unit (28) configured to set a weight coefficient in a range from zero to one inclusive based on at least the actual damping speed or the estimated damping speed; and a target electric current setting unit (30) configured to set a sum of a first value and a second value as a target electric current of the damper, the first value being obtained by multiplying the second electric current by the weight coefficient, the second value being obtained by multiplying the first electric current by a value obtained by subtracting the weight coefficient from one, wherein the first electric current setting unit is configured to make the first electric current smaller than the second electric current in a case where the actual damping speed or the estimated damping speed is within a prescribed range.

According to this arrangement, a ratio between the first electric current and the second electric current is changed to set the target electric current of the variable damping force damper. The first electric current is set based on the actual damping speed that changes according to the unevenness of a road surface, while the second electric current is set based on the model damping speed. Accordingly, a ratio of the first electric current can be increased in a case where the influence of the unevenness of a road surface is large, while a ratio of the second electric current can be increased in a case where the influence of the unevenness of a road surface is small, so that the target electric current can be set properly. The first electric current setting unit makes the first electric current smaller than the second electric current in a case where the actual damping speed is within a prescribed range, thereby preventing an excessive damping force from being generated according to the little unevenness of a road surface and the like. On the other hand, the second electric current setting unit can properly set the second electric current based on the model damping speed and the target damping force, even when the model damping speed is relatively small.

Preferably, the weight coefficient setting unit is configured to set a first coefficient in a range from zero to one inclusive based on a difference between an amplitude of a low frequency component of the actual damping speed or the estimated damping speed and an amplitude of a low frequency component of the model damping speed such that the first coefficient becomes smaller as the difference therebetween becomes larger, and to set the weight coefficient based on at least the first coefficient.

According to this arrangement, the unevenness of a road surface can be estimated based on a difference between an amplitude of a low frequency component of the actual damping speed and an amplitude of a low frequency component of the model damping speed. The aforementioned difference becomes larger in a case where the unevenness of a road surface is great.

Preferably, the weight coefficient setting unit is configured to set a second coefficient in a range from zero to one inclusive based on an amplitude of a high frequency component of the actual damping speed or the estimated damping speed such that the second coefficient becomes smaller as the amplitude thereof becomes larger, and to set one of the first coefficient and the second coefficient as the weight coefficient. Preferably, the weight coefficient setting unit is configured to set smaller one of the first coefficient and the second coefficient as the weight coefficient.

According to this arrangement, the unevenness of a road surface can be estimated based on an amplitude of the high frequency component of the actual damping speed. In a case where the amplitude of the high frequency component of the actual damping speed is large, the unevenness of a road surface can be estimated to be great.

Preferably, the weight coefficient setting unit is configured to set the weight coefficient to one, in a case where a difference between the model damping speed and the actual damping speed is zero, and to set the weight coefficient to zero, in a case where the difference between the model damping speed and the actual damping speed is equal to or more than a prescribed value.

Preferably, the first electric current setting unit is configured to set a first limit area where the first electric current is set to zero regardless of the actual damping speed, and the second electric current setting unit is configured to set a second limit area where the second electric current is set to zero regardless of the model damping speed, and the first limit area is wider than the second limit area.

Thus, according to one embodiment of the present invention, it is possible to provide a suspension control system for a vehicle including a variable damping force damper, in which a damping force of the damper can be generated properly without being excessive.

DESCRIPTION OF THE PREFERRED EMBODIMENT(S)

Figure 1:
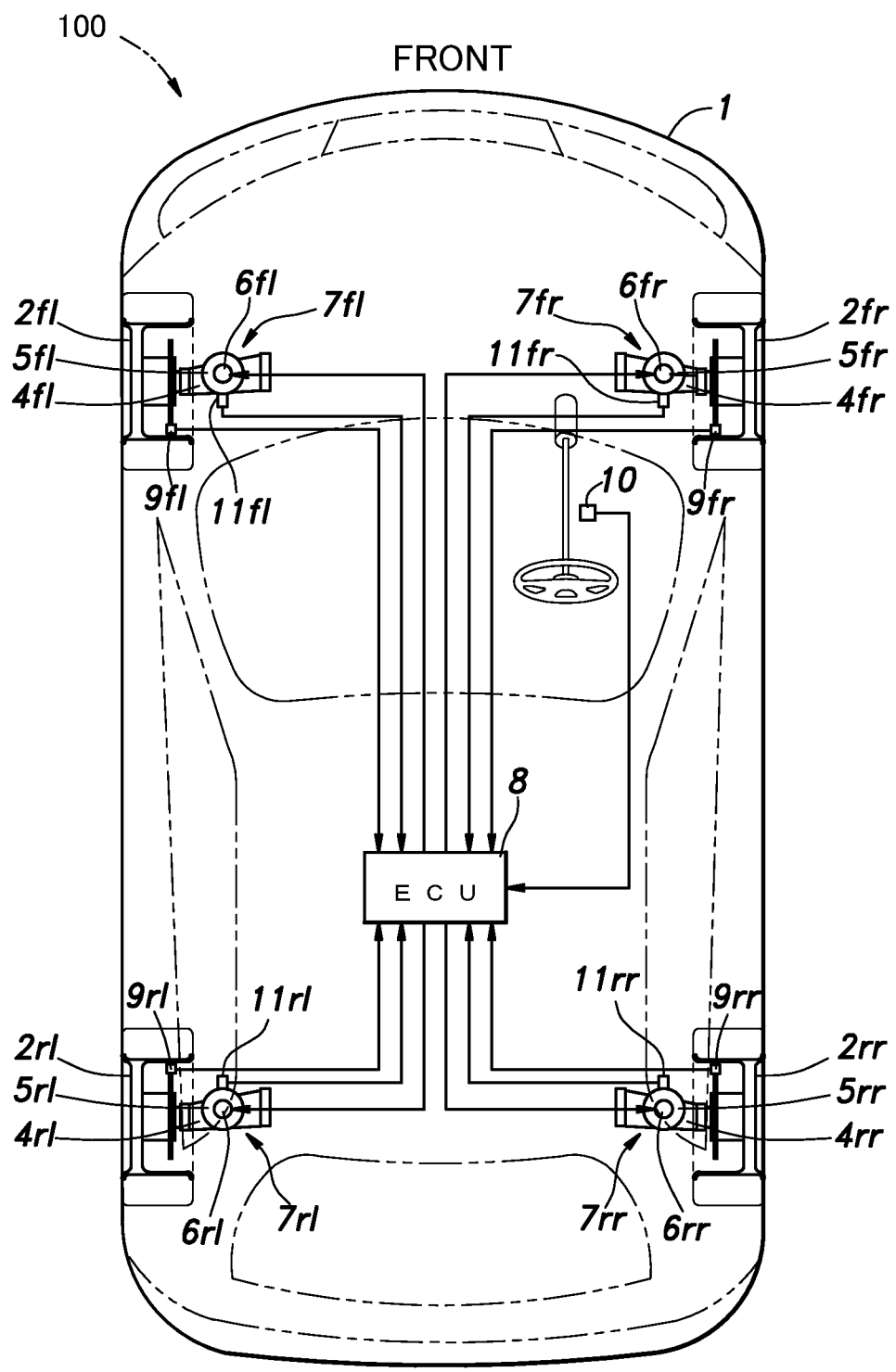
FIG. 1 is a schematic diagram of a vehicle provided with a suspension control system according to a first embodiment of the present invention.

In the following, a four-wheeled vehicle 100 provided with a suspension control system 20 according to a first embodiment of the present invention will be described with reference to the appended drawings. In the drawings, the reference numerals for the four wheels and the various components (such as dampers) associated with the wheels are appended with suffixes for indicating a front, a rear, a left, and a right. For example, the reference numeral "2" for the four wheels is appended with fl, fr, rl, or rr, such that "2*fl* (front, left)" denotes a left front wheel, "2*fr* (front, right)" denotes a right front wheel, "2*rl* (rear, left)" denotes a left rear wheel, and "2*rr* (rear, right)" denotes a right rear wheel.

As shown in FIG. 1, the wheels 2 are installed at a left front side, a right front side, a left rear side, and a right rear side of a vehicle body 1 of the vehicle 100. Each of these wheels 2 is supported by the vehicle body 1 via a suspension device 7 including a suspension arm 4, a spring 5, a variable damping force damper 6 (hereinafter, simply referred to as a damper 6), and the like. In the present embodiment, the vehicle 100 consists of an FF vehicle whose front wheels 2*fl*, 2*fr* are driven.

The vehicle 100 includes an Electronic Control Unit 8 (ECU) and sensors, such as wheel speed sensors 9 (an example of a vehicle sensor), a steering angle sensor 10 (an example of a vehicle sensor), stroke sensors 11, and the like. The ECU 8 is utilized for various control. The wheel speed sensors 9 and the steering angle sensor 10 detect a vehicle state quantity. Each wheel speed sensor 9 detects a wheel speed Vw, which is a rotational speed of each wheel 2. A vehicle speed V can be obtained by averaging the wheel speed Vw of each wheel 2. The steering angle sensor 10 obtains a steering angle δ of each front wheel 2. For example, the steering angle sensor 10 may obtain the steering angle δ by detecting a rotating angle of a steering shaft. Each stroke sensor 11 is installed in the corresponding damper 6, and detects a stroke position Sp (extending/retracting position) of the damper 6. The vehicle 100 may include other sensors, such as a yaw rate sensor for detecting a yaw rate of the vehicle body 1, a brake pressure sensor for detecting a brake fluid pressure of a brake device, a torque sensor for detecting a driving torque of the vehicle 100, a gear position sensor for detecting a gear position of a transmission device, and the like.

The ECU 8 includes a microcomputer, a ROM, a RAM, peripheral circuits, an input/output interface, various drivers, and the like, and is connected to the dampers 6 of the respective wheels 2 and the sensors 9-11 via a communication line, such as a Controller Area Network (CAN). The suspension control system 20 is constituted of the ECU 8, the sensors 9-11, and the like.

The dampers 6 are provided between the vehicle body 1 and the respective wheels 2. Each damper 6 may consist of any per se known variable damping force damper that can change the damping force based on an electric signal input from the ECU 8. For example, each damper 6 consists of a magneto-rheological damper (MR damper) that uses a magneto-rheological fluid (MRF) as the damping fluid and is provided with a pair of chambers separated by a piston and communicated with each other via a communication passage (orifice) fitted with a coil for selectively creating a magnetic field in the communication passage. Alternatively, each damper 6 may have a communication passage whose cross-sectional area can be varied by an input electric signal applied to a suitable device provided in the communication passage. In the present embodiment, each damper 6 consists of an MR damper. When an electric current is applied to the coil from the ECU 8, the magnetic field is applied to the MRF flowing through the communication passage, so that ferromagnetic particles in the MRF form chain clusters. Thereby, the viscosity of the MRF flowing through the communication passage increases, so that the damping force of each damper 6 increases. The damper 6 includes a cylinder and a piston rod. A lower end of the cylinder is connected to an upper face of the suspension arm 4, which may be considered as a wheel side member. An upper end of the piston rod is connected to a damper base (an upper part of a wheel house), which may be considered as a vehicle body side member.

Figure 2:
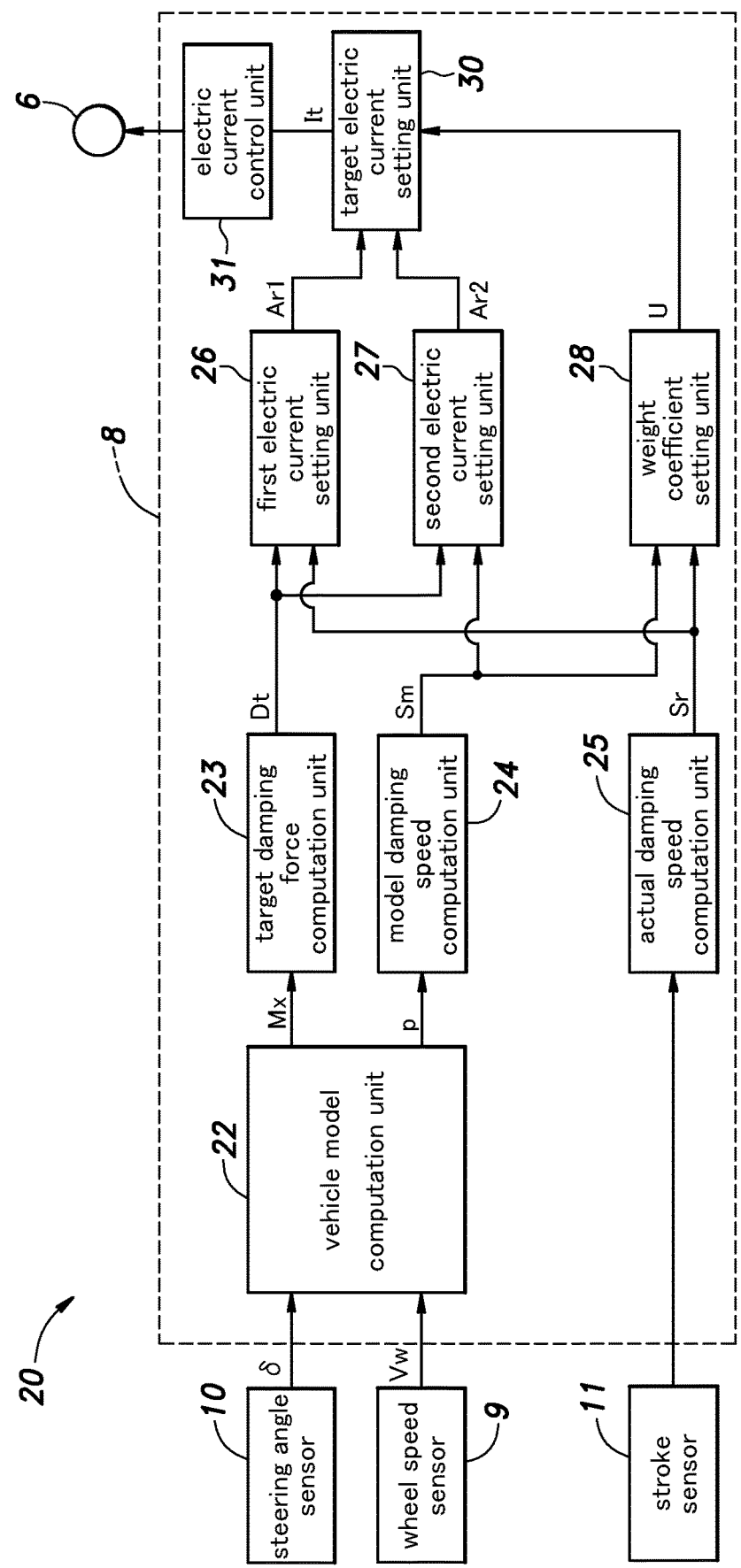
FIG. 2 is a block diagram of the suspension control system.

As shown in FIG. 2, the ECU 8 includes a vehicle model computation unit 22 that estimates the vehicle state quantity of the vehicle 100, a target damping force computation unit 23, a model damping speed computation unit 24, an actual damping speed computation unit 25, a first electric current setting unit 26, a second electric current setting unit 27, a weight coefficient setting unit 28, a target electric current setting unit 30, and an electric current control unit 31. Detection signals from various sensors including the wheel speed sensors 9, the steering angle sensor 10, and the stroke sensors 11 are input to the ECU 8.

The vehicle model computation unit 22 utilizes a prescribed vehicle model to compute a sideslip angle β, a yaw rate γ, a roll rate p, a roll angle φ, and a target roll moment Mx, based on the steering angle δ of each front wheel 2 obtained by the steering angle sensor 10 and the wheel speed Vw of each wheel 2 obtained by each wheel speed sensor 9. The vehicle model is set based on the following equations (1) to (5).

$$mV(\dot{\beta}+\gamma)-m_s h_s p = -2K_f\left(\beta+\frac{l_f}{V}\gamma-\delta_f\right)-2K_r\left(\beta-\frac{l_r}{V}\gamma-\delta_r\right) \quad (1)$$

$$I_Z\dot{\gamma} = -2l_f K_f\left(\beta+\frac{l_f}{V}\gamma-\delta_f\right)+2l_r K_r\left(\beta-\frac{l_r}{V}\gamma-\delta_r\right) \quad (2)$$

$$I_x \dot{p} - m_s h_s V(\dot{\beta}+\gamma)-m_s h_s g\varphi = -K_\varphi\varphi-C_\varphi p \quad (3)$$

$$\dot{\varphi} = p \quad (4)$$

$$M_x = -C_\varphi p \quad (5)$$

In the above equations (1) to (5), "m" represents mass of the vehicle 100, "V" represents a vehicle speed, "β" represents a sideslip angle, "γ" represents a yaw rate, "$m_s$" represents sprung mass, "$h_s$" represents arm length of the roll moment, "p" represents a roll rate, "$K_f$" represents equivalent cornering power of one of the front wheels 2, "$K_r$" represents equivalent cornering power of one of the rear wheels, "$l_f$" represents a distance between the center of gravity and the axle of each front wheel 2, "$l_r$" represents a distance between the center of gravity and the axle of each rear wheel 2, "$\delta_f$" represents a steering angle of each front wheel 2, "$\delta_r$" represents a steering angle of each rear wheel 2, "$I_z$" represents a yaw moment of inertia around the Z axis of the vehicle coordinate system, "$I_x$" represents a roll moment of inertia of the sprung mass around the X axis of the vehicle coordinate system, "g" represents acceleration of gravity, "φ" represents a roll angle, "$K_\varphi$" represents a roll rigidity, and "$C_\varphi$" represents a roll damping coefficient. "m", "$m_s$", "$h_s$", "$K_f$", "$K_r$", "$l_f$", "$l_r$", "$I_z$", "$I_x$", "$K_\varphi$", and "$C_\varphi$" are set in advance for each vehicle 100. Since the vehicle 100 according to the present embodiment is a front wheel steering vehicle, the steering angle $\delta_f$ of each front wheel 2 is the steering angle δ obtained by the steering angle sensor 10, and the steering angle $\delta_r$ of each rear wheel 2 is fixed at zero.

The target damping force computation unit 23 computes the target damping force Dt ($Dt_{fl}$, $Dt_{fr}$, $Dt_{rl}$, $Dt_{rr}$) of each damper 6 for suppressing the roll of the vehicle 100, based on the target roll moment Mx computed by the vehicle model computation unit 22. For example, the target damping force computation unit 23 computes the target damping force $Dt_{fl}$, $Dt_{fr}$, $Dt_{rl}$, $Dt_{rr}$ of each damper 6fl, 6fr, 6rl, 6rr according to the target roll moment Mx, based on the following equations (6) to (9).

$$Dt_{fl} = M_x \frac{2}{T_f} R_f \quad (6)$$

$$Dt_{fr} = -M_x \frac{2}{T_f} R_f \quad (7)$$

$$Dt_{rl} = M_x \frac{2}{T_r} R_r \quad (8)$$

$$Dt_{rr} = -M_x \frac{2}{T_r} R_r \quad (9)$$

In the above equations (6) to (9), "$T_f$" represents a tread of the front wheels 2fl, 2fr, "$T_r$" represents a tread of the rear wheels 2rl, 2rr, "$R_f$" represents a lever ratio of the front dampers 6fl, 6fr, and "Rr" represents a lever ratio of the rear dampers 6rl, 6rr.

The model damping speed computation unit 24 computes the damping speed of each damper 6 (6fl, 6fr, 6rl, 6rr) as the model damping speed $Sm_{fl}$, $Sm_{fr}$, $Sm_{rl}$, $Sm_{rr}$), based on the roll rate p computed by the vehicle model computation unit 22. For example, the model damping speed computation unit 24 sets the model damping speed $Sm_{fl}$, $Sm_{fr}$, $Sm_{rl}$, $Sm_{rr}$ of each damper 6fl, 6fr, 6rl, 6rr corresponding to the roll rate p, based on the following equations (10) to (13).

$$Sm_{fl} = p\frac{T_f}{2}\frac{1}{R_f} \quad (10)$$

$$Sm_{fr} = -p\frac{T_f}{2}\frac{1}{R_f} \quad (11)$$

$$Sm_{rl} = p\frac{T_r}{2}\frac{1}{R_r} \quad (12)$$

$$Sm_{rr} = -p\frac{T_r}{2}\frac{1}{R_r} \quad (13)$$

The stroke sensors 11 correspond to the respective dampers 6 and output signals according to the positions of the respective dampers 6. The actual damping speed computation unit 25 computes the actual damping speed Sr ($Sr_{fl}$, $Sr_{fr}$, $Sr_{rl}$, $S_{rr}$), which is the stroke speed of each damper 6 (6fl, 6fr, 6rl, 6a), by differentiating the signal according to the position of each damper 6 input from each stroke sensor 11.

Figure 3:
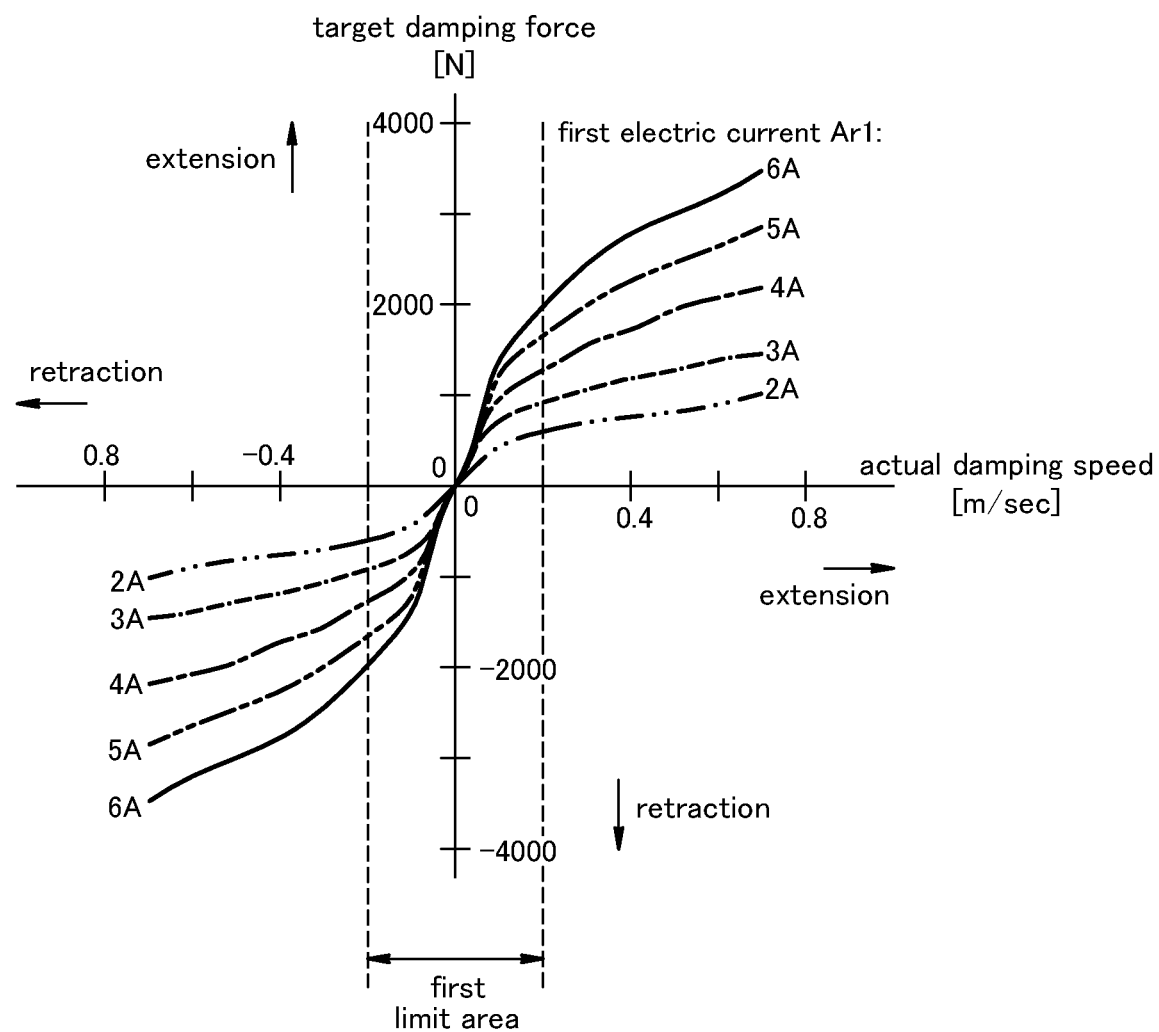
FIG. 3 is a first electric current map used by a first electric current setting unit.

The first electric current setting unit 26 sets a first electric current Ar1 for each damper 6 by referring to a first electric current map shown in FIG. 3 based on the target damping force Dt of each damper 6 computed by the target damping force computation unit 23 and the actual damping speed Sr of each damper 6 computed by the actual damping speed computation unit 25. The first electric current map defines a first limit area (first dead zone) where the first electric current Ar1 is decreased on condition that the actual damping speed Sr is equal to or less than a prescribed first absolute value. In the first limit area, the first electric current Ar1 may be set to a prescribed value (for example, zero) regardless of the actual damping speed Sr and the target damping force Dt. Alternatively, in the first limit area, the first electric current Ar1 may be set by multiplying a value based on the actual damping speed Sr and the target damping force Dt by a coefficient in a range from zero to one inclusive.

Figure 4:
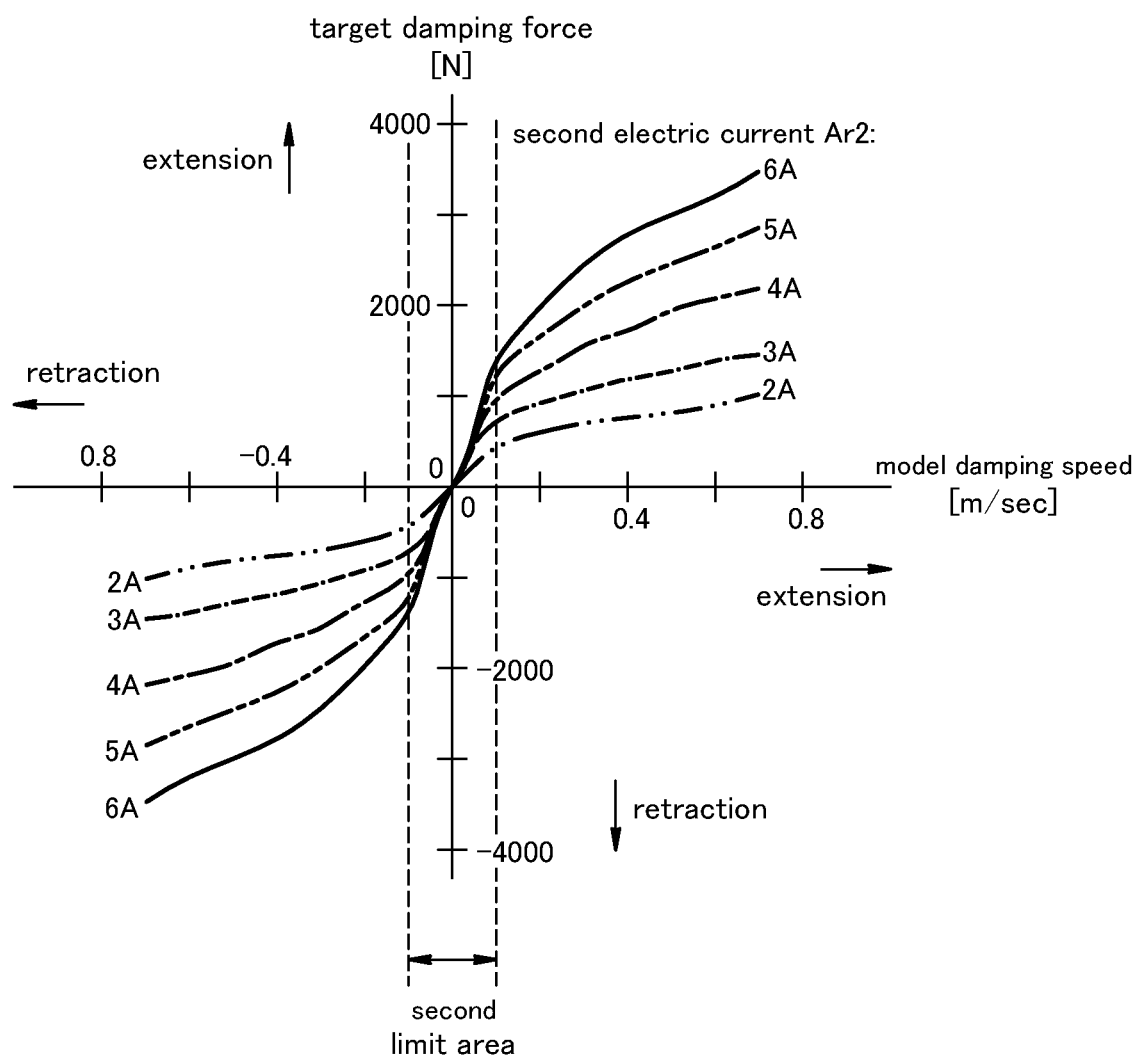
FIG. 4 is a second electric current map used by a second electric current setting unit.

The second electric current setting unit 27 sets a second electric current Ar2 for each damper 6 by referring to a second electric current map shown in FIG. 4, based on the target damping force Dt computed by the target damping force computation unit 23 and the model damping speed Sm computed by the model damping speed computation unit 24. The second electric current map defines a second limit area (second dead zone) where the second electric current Ar2 is decreased on condition that the model damping speed Sm is equal to or less than a prescribed second absolute value. In the second limit area, the second electric current Ar2 may be set to a prescribed value (for example, zero) regardless of the model damping speed Sm and the target damping force Dt. Alternatively, in the second limit area, the second electric current Ar2 may be set by multiplying a value based on the model damping speed Sm and the target damping force Dt by a coefficient in a range from zero to one inclusive.

The second limit area (the second absolute value of the model damping speed Sm) in the second electric current map is smaller than the first limit area (the first absolute value of the actual damping speed Sr) in the first electric current map. Therefore, the second electric current Ar2 set by the second electric current setting unit 27 becomes larger than the first electric current Ar1 set by the first electric current setting unit 26 in a case where the model damping speed Sm and the actual damping speed Sr are equal to each other, since the model damping speed Sm is out of the second limit area while the actual damping speed Sr is within the first limit area. In other words, the first electric current setting unit 26 makes the first electric current Ar1 smaller than the second electric current Ar2 in a case where the actual damping speed Sr is within a prescribed range.

Figure 5:
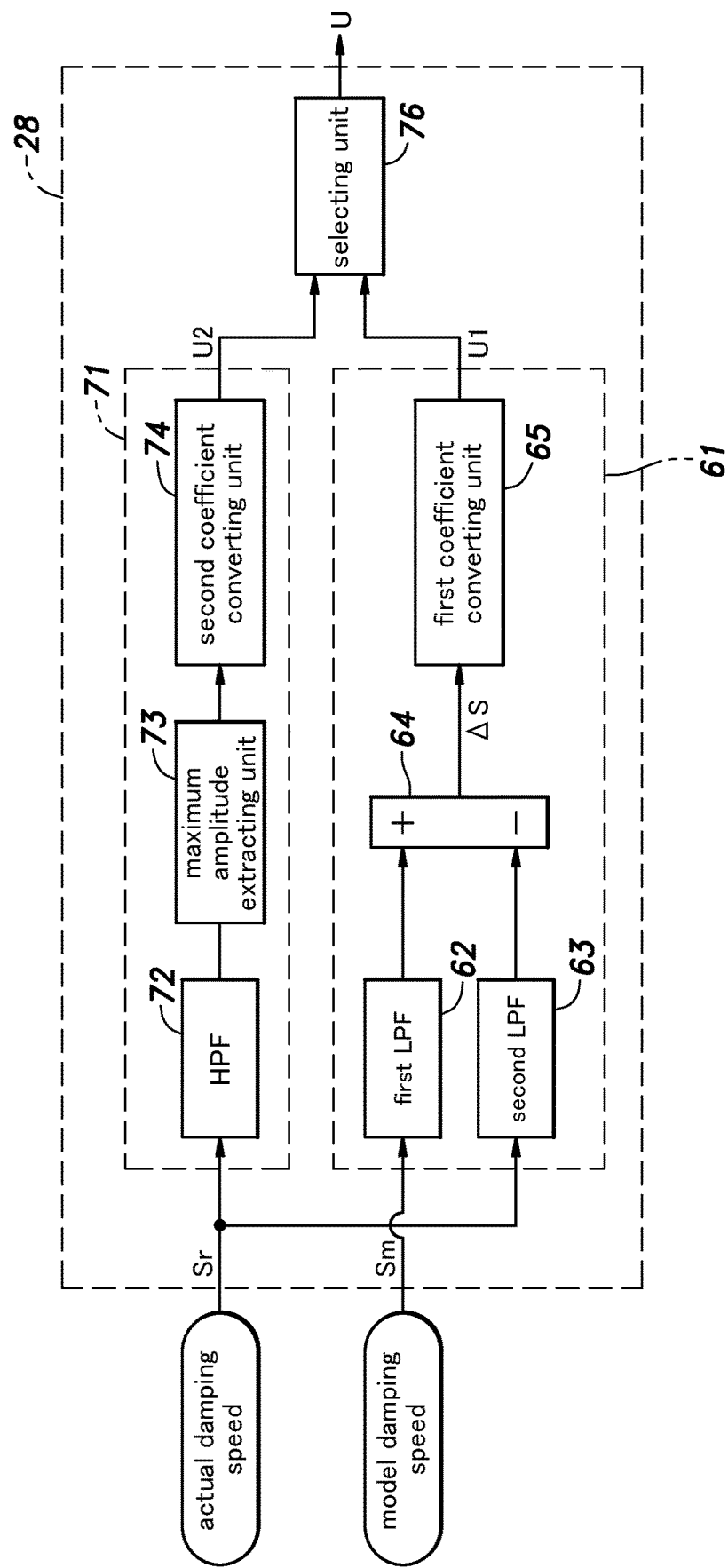
FIG. 5 is a block diagram of a weight coefficient setting unit.

The weight coefficient setting unit 28 sets a weight coefficient U in a range from zero to one inclusive based on at least the actual damping speed Sr. FIG. 5 shows details of the weight coefficient setting unit 28. In the present embodiment, the weight coefficient setting unit 28 sets the weight coefficient U corresponding to each damper 6, based on the actual damping speed Sr and the model damping speed Sm corresponding to each damper 6. In the following description of the weight coefficient setting unit 28, a setting method for the weight coefficient U of one damper 6 on behalf of the four dampers 6 will be described. The weight coefficients U of other three dampers 6 are set by the same process.

The weight coefficient setting unit 28 includes a first coefficient setting unit 61 that sets a first coefficient U1 in a range from zero to one inclusive based on a difference between an amplitude of a low frequency component of the actual damping speed Sr and an amplitude of a low frequency component of the model damping speed Sm. The first coefficient setting unit 61 includes a first low-pass filter 62 (first LPF), a second low-pass filter 63 (second LPF), a difference computation unit 64, and a first coefficient converting unit 65. The first low-pass filter 62 extracts the low frequency component of the model damping speed Sm. The second low-pass filter 63 extracts the low frequency component of the actual damping speed Sr. The difference computation unit 64 subtracts the low frequency component of the actual damping speed Sr extracted by the second low-pass filter 63 from the low frequency component of the model damping speed Sm extracted by the first low-pass filter 62 to compute a difference $\Delta S$. The first coefficient converting unit 65 converts the difference $\Delta S$ computed by the difference computation unit 64 into the first coefficient U1. The first coefficient converting unit 65 makes the first coefficient U1 closer to one as the difference $\Delta S$ becomes smaller, and makes the first coefficient U1 closer to zero as the difference $\Delta S$ becomes greater. The first coefficient converting unit 65 may set the first coefficient U1 to one in a case where the difference $\Delta S$ is 0, and set the first coefficient U1 to zero in a case where the difference $\Delta S$ is equal to or more than a prescribed value.

The first coefficient setting unit 61 estimates that the unevenness of a road surface is small and sets the first coefficient U1 greater, when the difference $\Delta S$ between the low frequency component of the model damping speed Sm and the low frequency component of the actual damping speed Sr is small. As the first coefficient U1 becomes greater, the influence of the second electric current Ar2 on the target electric current It of the damper 6 (which will be described later) becomes greater than that of the first electric current Ar1.

The weight coefficient setting unit 28 includes a second coefficient setting unit 71 that sets a second coefficient U2 in a range from zero to one inclusive based on an amplitude of a high frequency component of the actual damping speed Sr. The second coefficient setting unit 71 includes a high-pass filter 72 (HPF), a maximum amplitude extracting unit 73, and a second coefficient converting unit 74. The high-pass filter 72 extracts the high frequency component of the actual damping speed Sr. The maximum amplitude extracting unit 73 extracts a maximum amplitude from a predetermined number of peak values of the high frequency component of the actual damping speed Sr extracted by the high-pass filter 72. The second coefficient converting unit 74 converts the maximum amplitude of the high frequency component of the actual damping speed Sr extracted by the maximum amplitude extracting unit 73 to a second coefficient U2. The second coefficient converting unit 74 makes the second coefficient U2 closer to one as the maximum amplitude of the high frequency component of the actual damping speed Sr becomes smaller, and makes the second coefficient U2 closer to zero as the maximum amplitude of the high frequency component of the actual damping speed Sr becomes greater. The second coefficient converting unit 74 may set the second coefficient U2 to zero in a case where the maximum amplitude is equal to or more than a prescribed upper limit, and set the second coefficient U2 to one in a case where the maximum amplitude is equal to or less than a prescribed lower limit.

The second coefficient setting unit 71 estimates that the unevenness of a road surface is small and sets the second coefficient U2 greater, when the maximum amplitude of the high frequency component of the actual damping speed Sr is small. As the second coefficient U2 becomes greater, the influence of the second electric current Ar2 on the target electric current It of the damper 6 (which will be described later) becomes greater than that of the first electric current Ar1.

The weight coefficient setting unit 28 includes a selecting unit 76 that sets the smaller one of the first coefficient U1 set by the first coefficient setting unit 61 and the second coefficient U2 set by the second coefficient setting unit 71 as the weight coefficient U. In other embodiments, the selecting unit 76 may set the larger one of the first coefficient U1 and the second coefficient U2 as the weight coefficient U, or set an average of the first coefficient U1 and the second coefficient U2 as the weight coefficient U.

As shown in FIG. 2, the target electric current setting unit 30 computes the target electric current It based on the first electric current Ar1 computed by the first electric current setting unit 26, the second electric current Ar2 computed by the second electric current setting unit 27, and the weight coefficient U. Specifically, as shown in the following equation (14), the target electric current setting unit 30 sets a sum of a first value and a second value as the target electric current It. The first value is obtained by multiplying the second electric current Ar2 by the weight coefficient U, and the second value is obtained by multiplying the first electric current Ar1 by a value obtained by subtracting the weight coefficient U from one.

$$It = (1 - U) \times \text{Ar1} + U \times \text{Ar2} \quad (14)$$
$\underbrace{\phantom{(1-U)\times \text{Ar1}}}_{\text{second value}} \underbrace{\phantom{U\times\text{Ar2}}}_{\text{first value}}$ The electric current control unit 31 performs PWM control on a switching circuit based on the target electric current It, and applies the target electric current It to the corresponding damper 6 to control the damping force of the damper 6.

When the vehicle 100 travels, the ECU 8 having the aforementioned structure performs damping force control of each damper 6, computes the target electric current It at prescribed process intervals (for example, 10 ms), and applies the computed target electric current It to each damper 6 to control the damping force of each damper 6. First, the vehicle model computation unit 22 of the ECU 8 computes the target roll moment Mx generated at the vehicle 100 based on the vehicle state quantity input from the sensors 9, 10 and the prescribed vehicle model, and the model damping speed computation unit 24 of the ECU 8 computes the model damping speed Sm, which is the stroke speed of each damper 6 at the moment.

Next, the target damping force computation unit 23 of the ECU 8 computes the target damping force Dt of each damper 6 based on the target roll moment Mx. Also, the actual damping speed computation unit 25 of the ECU 8 computes the actual damping speed Sr based on the stroke position of each damper 6 detected by each stroke sensor 11. Also, the first electric current setting unit 26 of the ECU 8 sets the first electric current Ar1 by referring to the first electric current map base on the target damping force Dt and the actual damping speed Sr. Also, the second electric current setting unit 27 of the ECU 8 sets the second electric current Ar2 by referring to the second electric current map based on the target damping force Dt and the model damping speed Sm.

Also, the weight coefficient setting unit 28 of the ECU 8 sets the weight coefficient U based on the actual damping speed Sr and the model damping speed Sm. In other words, the weight coefficient setting unit 28 estimates the unevenness of a road surface where the vehicle 100 travels based on the actual damping speed Sr and the model damping speed Sm. The weight coefficient setting unit 28 sets the weight coefficient U closer to one so that the influence of the second electric current Ar2 on the target electric current It becomes greater than that of the first electric current Ar1, in a case where the unevenness of a road surface is estimated to be small. On the other hand, the weight coefficient setting unit 28 sets the weight coefficient U closer to zero so that the influence of the first electric current Ar1 on the target electric current It becomes greater than that of the second electric current Ar2, in a case where the unevenness of a road surface is estimated to be large.

Next, the target electric current setting unit 30 of the ECU 8 sets the target electric current It based on the first electric current Ar1, the second electric current Ar2, and the weight coefficient U. The target electric current It becomes closer to the second electric current Ar2 than the first electric current Ar1, as the weight coefficient U becomes closer to one, i.e. as the unevenness of a road surface is estimated to be smaller.

According to the above structure, it is possible to make the target electric current It closer to the second electric current Ar2 and to generate a small damping force, in a case where the unevenness of a road surface where the vehicle 100 travels is estimated to be small based on the actual damping speed Sr and the model damping speed Sm. On the other hand, it is possible to suppress an excessive damping force caused by the unevenness of a road surface, in a case where the unevenness of a road surface where the vehicle 100 travels is estimated to be large, since the target electric current It becomes closer to the first electric current Ar1, which is set based on the first electric current map defining the first limit area (first dead zone) of the actual damping speed Sr.

Figure 6:
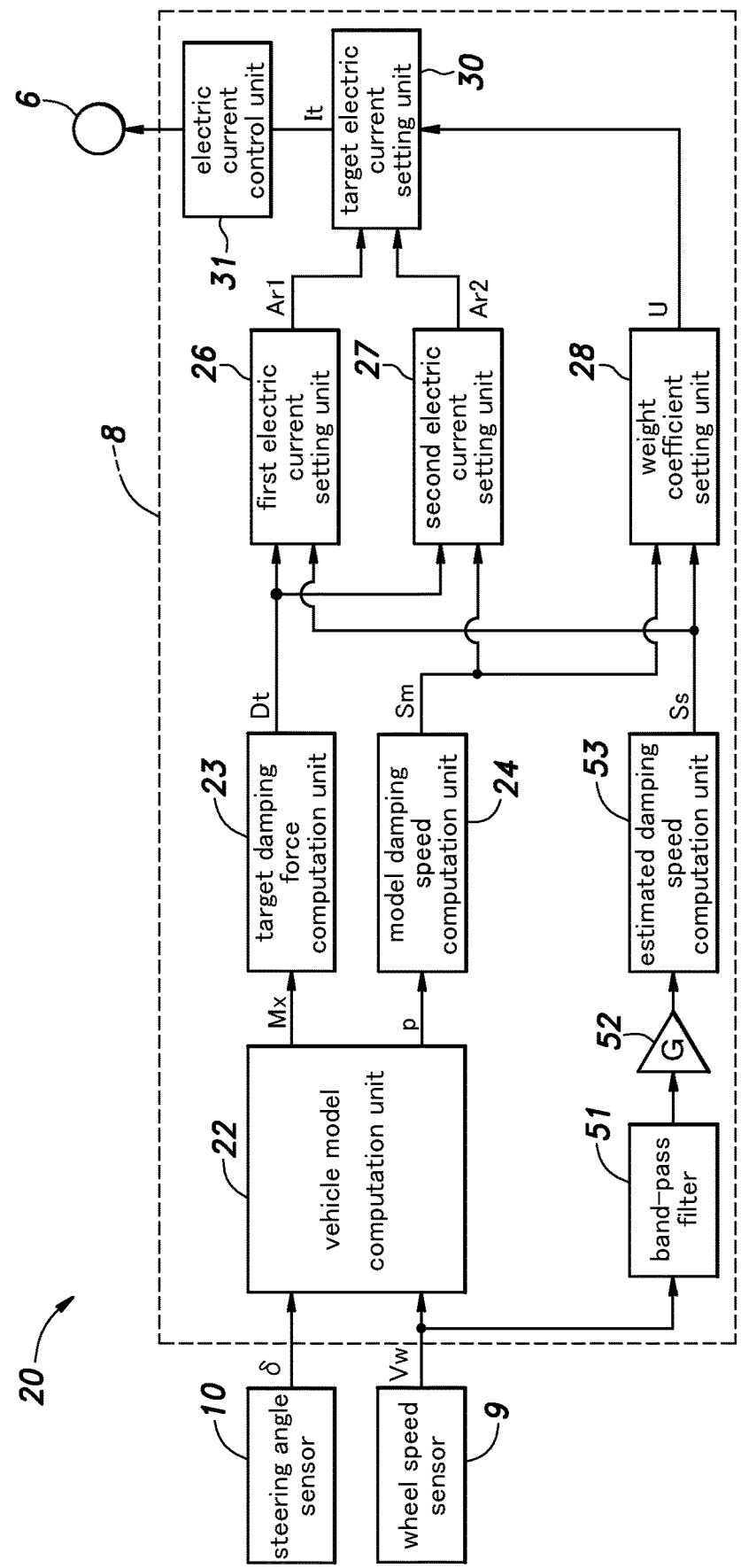
FIG. 6 is a block diagram of a suspension control system according to a second embodiment of the present invention.

As shown in FIG. 6, the suspension control system 20 according to the second embodiment includes a band-pass filter 51, a gain circuit 52, and an estimated damping speed computation unit 53. The suspension control system 20 according to the second embodiment estimates a damping speed (stroke speed) of each damper 6 as an estimated damping speed Ss based on the wheel speed Vw detected by each wheel speed sensor 9. Thereby, it is possible to do without each stroke sensor 11 for detecting the actual damping speed Sr.

The wheel speed Vw detected by each wheel speed sensor 9 is input to the band-pass filter 51. The band-pass filter 51 has a band-pass property to allow passage of a frequency component of 0.5 to 5 Hz. That is, the band-pass filter 51 has a low-pass property to allow passage of a frequency component in a band less than about 5 Hz so that a high frequency component can be blocked and a frequency component in a sprung resonance band (signals in a frequency range corresponding to a sprung vibration) can be securely extracted. Alternatively, in a case where signals of the wheel speed Vw are input with shorter updating cycles, the band-pass filter 51 having a low-pass property of a higher band (for example, 20 Hz) may be used so that a frequency component in an unsprung resonance band can also be extracted.

The gain circuit 52 utilizes a regular correlation ($u_1 = k\Delta Vw$; k is a proportional constant) between a wheel speed change $\Delta Vw$ and an unsprung load $u_1$ (a change of a ground contact load) to convert the wheel speed change $\Delta Vw$ to the unsprung load $u_1$.

The estimated damping speed computation unit 53 computes the estimated damping speed Ss, which is an estimated value of the stroke speed of each damper 6, based on the unsprung load $u_1$ and a single-wheel model. For example, the single-wheel model can be represented by the following equation (15) in which the unsprung load $u_1$ of each wheel 2 is set as an input u.

$$u = M_1 \ddot{x}_1 + M_2 \ddot{x}_2 \quad (15)$$

In the above equation (15), "$M_1$" represents unsprung mass, "$M_2$" represents sprung mass, "$x_1$" represents an unsprung position in the up-and-down direction, "$x_2$" represents a sprung position in the up-and-down direction, "$d^2x_1/dt^2$" represents unsprung acceleration in the up-and-down direction, and "$d^2x_2/dt^2$" represents sprung acceleration in the up-and-down direction.

In the above equation (15), the unsprung mass $M_1$ and the sprung mass $M_2$ are known. On the other hand, the input u includes not only the unsprung load $u_1$ but also the damping force $u_2$ of each damper 6, since each damper 6 consists of the variable damping force damper. The damping force $u_2$ of each damper 6 can be obtained based on the unsprung load $u_1$ in the single-wheel model. Accordingly, on condition that the unsprung load $u_1$ can be obtained based on the wheel speed Vw, the unsprung acceleration $d^2x_1/dt^2$ in the up-and-down direction, the sprung acceleration $d^2x_2/dt^2$ in the up-and-down direction, the unsprung position $x_1$ in the up-and-down direction, and the unsprung speed $dx_1/dt$ can be obtained by using a system matrix. In the system matrix, the unsprung load $u_1$ and the damping force $u_2$ of each damper 6, which is computed based on the unsprung load $u_1$, are set as the input u, and the spring constant K (the spring constant of the spring 5) between the unsprung mass $M_1$ and the sprung mass $M_2$, the unsprung mass $M_1$, and the sprung mass $M_2$ are considered. Incidentally, the estimated damping speed Ss is represented as $dx_2/dt - dx_1/dt$.

Specifically, $M_1 d^2x_1/dt^2$ and $M_2 d^2x_2/dt^2$ in the above equation (15) are represented in the following equations (16) and (17).

$$M_1 \ddot{x}_1 = u_1 - K_2(x_1 - x_2) - u_2 \quad (16)$$

In the above equation (16) and the following equation (17), "$u_1$" represents an unsprung load, "$u_2$" represents a damping force of each damper 6, and $K_2$ represents a spring constant.

$$M_2 \ddot{x}_2 = K_2(x_1 - x_2) + u_2 \quad (17)$$

In the single-wheel model, the state equation of the following equation (18) is set as a model, and a state variable x of the following equation (18) is obtained based on an input vector u.

$$\dot{x} = Ax + Bu \quad (18)$$

$$x = [x_1 x_2 \dot{x}_1 \dot{x}_2]^T \quad (19)$$

In the above equations (18) and (19), "x" represents a state variable vector, and "A" and "B" represent system matrixes. Based on the above equations (16)-(19), the above equation (18) is represented by the following equation (20).

$$\dot{x} = \begin{bmatrix} \dot{x}_1 \\ \dot{x}_2 \\ \ddot{x}_1 \\ \ddot{x}_2 \end{bmatrix} = \begin{bmatrix} 0 & 0 & 1 & 0 \\ 0 & 0 & 0 & 1 \\ -\frac{K_2}{M_1} & \frac{K_2}{M_1} & 0 & 0 \\ \frac{K_2}{M_2} & -\frac{K_2}{M_2} & 0 & 0 \end{bmatrix} \begin{bmatrix} x_1 \\ x_2 \\ \dot{x}_1 \\ \dot{x}_2 \end{bmatrix} + \begin{bmatrix} 0 & 0 \\ 0 & 0 \\ \frac{1}{M_1} & -\frac{1}{M_1} \\ 0 & \frac{1}{M_2} \end{bmatrix} \begin{bmatrix} u_1 \\ u_2 \end{bmatrix} \quad (20)$$

Figure 7:
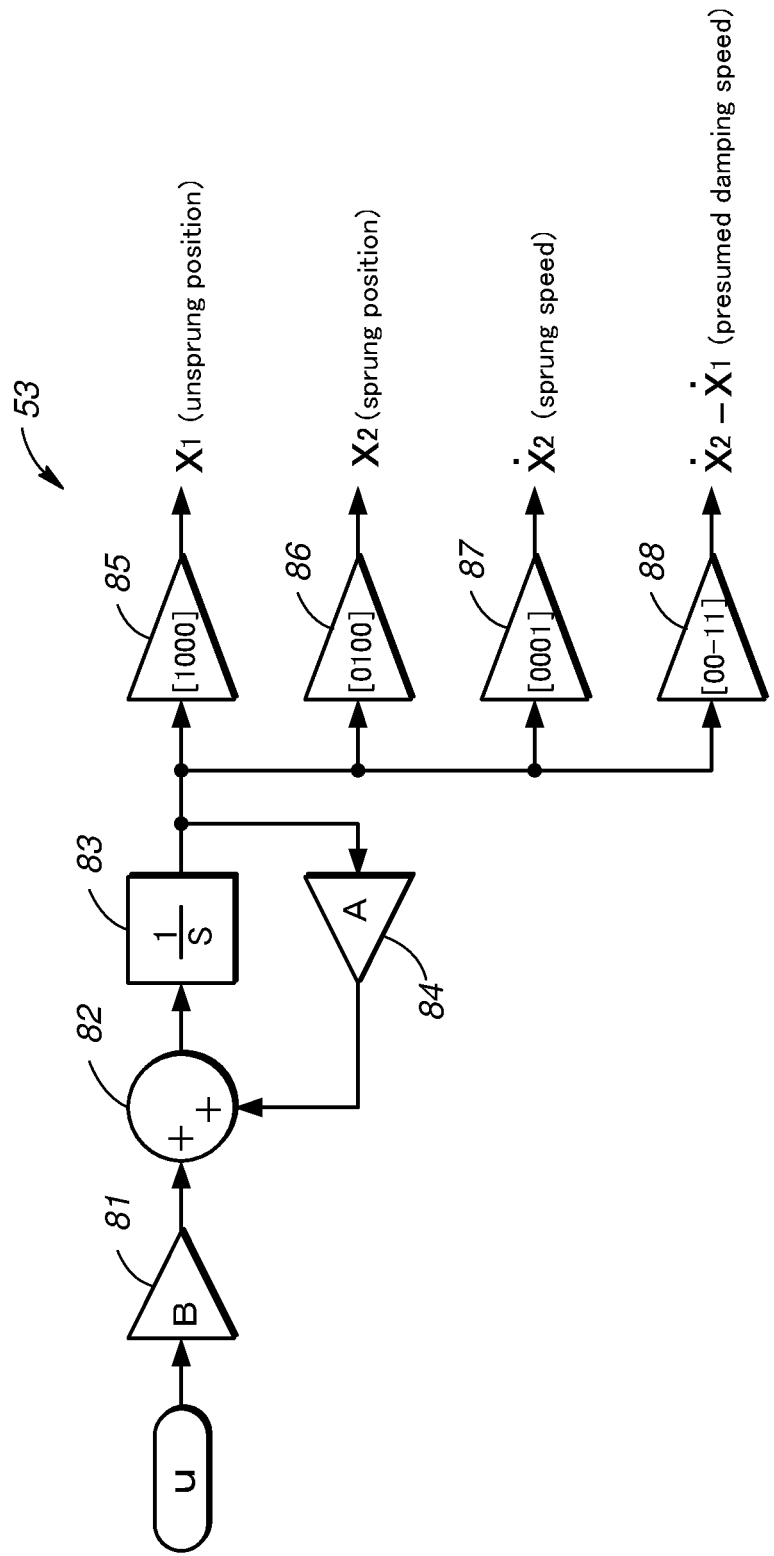
FIG. 7 is a block diagram of an estimated damping speed computation unit.

As shown in FIG. 7, in the single-wheel model provided with such a state equation, the input u is input to a computation unit 81 provided with the system matrix B, an output of the computation unit 81 is input to an integral unit 83 via an addition unit 82, an output of the integral unit 83 is input to a computation unit 84 provided with the system matrix A, and an output of the computation unit 84 is returned to the addition unit 82. The output of first to fourth observation matrixes 85-88 is obtained based on the single-wheel model, so that the unsprung position $x_1$, the sprung position $x_2$, the sprung speed $S_2$ ($dx_2/dt$), and the estimated damping speed Ss ($dx_2/dt - dx_1/dt$) are obtained. The first observation matrix 85 is an observation matrix of the unsprung position $x_1$, and is set to [1 0 0 0]. The second observation matrix 86 is an observation matrix of the sprung position $x_2$, and is set to [0 1 0 0]. The third observation matrix 87 is an observation matrix of the sprung speed $S_2$ ($dx_2/dt$), and is set to [0 0 0 1]. The fourth observation matrix 88 is an observation matrix of the estimated damping speed Ss ($dx_2/dt - dx_1/dt$), and is set to [0 0 -1 1]. That is, the first to fourth observation matrixes 85-88 of the single-wheel model are the means to obtain the unsprung position $x_1$, the sprung position $x_2$, the sprung speed $S_2$, and the estimated damping speed Ss based on the wheel speed change $\Delta Vw$.

In this way, by inputting the unsprung load $u_1$ obtained based on the wheel speed Vw to the single-wheel model, the estimated damping speed Ss can be obtained regardless of whether a caster angle is set for the suspension device 7.

The estimated damping speed Ss of each damper 6 computed by the estimated damping speed computation unit 53 is output to the first electric current setting unit 26 and the weight coefficient setting unit 28. The first electric current setting unit 26 sets the first electric current Ar1 in the same way as the first embodiment based on the target damping force Dt and the estimated damping speed Ss, which substitutes for the actual damping speed Sr. Also, the weight coefficient setting unit 28 sets the weight coefficient U in the same way as the first embodiment based on the model damping speed Sm and the estimated damping speed Ss, which substitutes for the actual damping speed Sr.

Concrete embodiments of the present invention have been described in the foregoing, but the present invention should not be limited by the foregoing embodiments and various modifications and alterations are possible within the scope of the present invention. The vehicle model computation unit 22 may compute a pitch moment or a yaw moment instead of the target roll moment Mx, and the target damping force computation unit 23 may compute the target damping force Dt based on the pitch moment or the yaw moment. Alternatively, the vehicle model computation unit 22 may compute the target roll moment Mx, the pitch moment, and the yaw moment, and the target damping force computation unit 23 may compute the target damping forces Dt based on each of the target roll moment Mx, the pitch moment, and the yaw moment, and then select one of the computed target damping forces Dt. The vehicle model computation unit 22 may compute a pitch rate or a yaw rate instead of the roll rate p, and the model damping speed computation unit 24 may compute the model damping speed Sm based on the pitch rate or the yaw rate.

The invention claimed is:

1. A suspension control system for a vehicle, comprising:
   a variable damping force damper configured to change a damping force based on an electric current applied thereto;
   a vehicle sensor configured to detect a vehicle state quantity;
   a vehicle model computation unit configured to compute at least one of a roll moment, a pitch moment, and a yaw moment generated at the vehicle and at least one of a roll rate, a pitch rate, and a yaw rate, based on the vehicle state quantity and a prescribed vehicle model;
   a target damping force computation unit configured to compute a target damping force of the damper based on the at least one of the roll moment, the pitch moment, and the yaw moment;
   a model damping speed computation unit configured to compute a model damping speed of the damper based on the at least one of the roll rate, the pitch rate, and the yaw rate;
   a first electric current setting unit configured to set a first electric current of the damper based on the target damping force and one of an actual damping speed or an estimated damping speed, the actual damping speed being computed based on a signal input from a stroke sensor provided in the damper, the estimated damping speed being estimated based on a wheel speed;
   a second electric current setting unit configured to set a second electric current of the damper based on the model damping speed and the target damping force;
   a weight coefficient setting unit configured to set a weight coefficient in a range from zero to one inclusive based on at least the actual damping speed;
   a target electric current setting unit configured to set a sum of a first value and a second value as a target electric current of the damper, the first value being obtained by multiplying the second electric current by the weight coefficient, the second value being obtained by multiplying the first electric current by a value obtained by subtracting the weight coefficient from one, and an electric current control unit configured to control the damper based upon the target electric current, wherein the first electric current setting unit is configured to make the first electric current smaller than the second electric current in a case where the actual damping speed or the estimated damping speed is within a prescribed range, and wherein the weight coefficient setting unit is configured to set the weight coefficient to one, in a case where a difference between the model damping speed and the actual damping speed is zero, and to set the weight coefficient to zero, in a case where the difference between the model damping speed and the actual damping speed is equal to or more than a prescribed value.

2. The suspension control system according to claim 1, wherein the weight coefficient setting unit is configured to set a first coefficient in a range from zero to one inclusive based on a difference between an amplitude of a low frequency component of the actual damping speed and an amplitude of a low frequency component of the model damping speed such that the first coefficient becomes smaller as the difference therebetween becomes larger, and to set the weight coefficient based on at least the first coefficient.

3. The suspension control system according to claim 2, wherein the weight coefficient setting unit is configured to set a second coefficient in a range from zero to one inclusive based on an amplitude of a high frequency component of the actual damping speed such that the second coefficient becomes smaller as the amplitude thereof becomes larger, and to set one of the first coefficient and the second coefficient as the weight coefficient.

4. The suspension control system according to claim 3, wherein the weight coefficient setting unit is configured to set smaller one of the first coefficient and the second coefficient as the weight coefficient.

5. The suspension control system according to claim 1, wherein
the first electric current setting unit is configured to set a first limit area where the first electric current is set to zero regardless of the actual damping speed, and
the second electric current setting unit is configured to set a second limit area where the second electric current is set to zero regardless of the model damping speed, and
the first limit area is wider than the second limit area.

* * * * *